US008089523B2

(12) United States Patent
Miyata

(10) Patent No.: US 8,089,523 B2
(45) Date of Patent: Jan. 3, 2012

(54) IMAGE PICKUP APPARATUS PERFORMING AUTOMATIC PHOTOGRAPHING PROCESSING, IMAGE PICKUP METHOD AND COMPUTER-READABLE RECORDING MEDIUM RECORDED WITH PROGRAM THEREOF

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 367 days.

(21) Appl. No.: 12/206,143

(22) Filed: Sep. 8, 2008

(65) Prior Publication Data
US 2009/0066803 A1   Mar. 12, 2009

(30) Foreign Application Priority Data
Sep. 10, 2007   (JP) .................. 2007-234102

(51) Int. Cl.
H04N 5/228   (2006.01)
H04N 5/76   (2006.01)
G03B 17/18   (2006.01)
G03B 17/00   (2006.01)

(52) U.S. Cl. ................. 348/222.1; 348/231.99; 396/287; 396/263

(58) Field of Classification Search ................. 348/222.1
See application file for complete search history.

(56) References Cited

U.S. PATENT DOCUMENTS
2006/0092292 A1   5/2006   Matsuoka et al.
2007/0019081 A1   1/2007   Nakashima
2007/0019094 A1   1/2007   Silberstein
2007/0195174 A1*  8/2007   Oren .................... 348/222.1

FOREIGN PATENT DOCUMENTS
| EP | 1 648 166 A2 | 4/2006 |
|---|---|---|
| JP | 2004-336265 A | 11/2004 |
| JP | 2005-56175 A | 3/2005 |
| JP | 2006-268248 A | 10/2006 |
| JP | 2007-20105 A | 1/2007 |
| JP | 2007-67560 A | 3/2007 |
| JP | 2007-150418 A | 6/2007 |
| JP | 2007-215064 A | 8/2007 |
| WO | WO 2007/004207 A | 1/2007 |

OTHER PUBLICATIONS

Japanese Office Action dated Aug. 25, 2009 (3 pages), and English translation thereof (6 pages), issued in counterpart Japanese Application Serial No. 2007-234102.
Extended European Search Report dated Dec. 4, 2008, issued in a counterpart European Application.

(Continued)

Primary Examiner — Tuan Ho
Assistant Examiner — Christopher K Peterson
(74) Attorney, Agent, or Firm — Holtz, Holtz, Goodman & Chick, PC

(57) ABSTRACT

Disclosed is an image pickup apparatus comprising: an image pickup section to pick up a subject image; and a central processing section to perform processing of arbitrarily setting at least one automatic photographing condition among a plurality of kinds of automatic photographing conditions, judging whether "the set automatic photographing condition" is satisfied or not, and instructing the image pickup section to pick up a recording subject image when "the set automatic photographing condition" is judged to be satisfied.

11 Claims, 12 Drawing Sheets

OTHER PUBLICATIONS

Japanese Office Action dated Jul. 12, 2011 (and English translation thereof) in counterpart Japanese Application No. 2010-037023.
U.S. Appl. No. 13/152,634, filed Jun. 3, 2011; First Named Inventor: Akira Miyata; Title: "Image Pickup Apparatus Performing Automatic Photographing Processing, Image Pickup Method and Computer-Readable Recording Medium Recorded With Program Thereof".

* cited by examiner

FIG. 7A

| JUDGMENT ORDER (N) | PHOTOGRAPHING CONDITION ITEM | PHOTOGRAPHING CONDITION CONTENT |
|---|---|---|
| 1 | STOPPED | LEVEL BAR INDICATING 4 OR MORE |
| 2 | SMILED | LEVEL BAR INDICATING 4 OR MORE |
| 3 | SOUND DETECTED | EXEMPT FROM PHOTOGRAPHING CONDITION |
| 4 | FACED CAMERA | LEVEL BAR INDICATING 4 OR MORE |
| 5 | EYES OPENED | EXEMPT FROM PHOTOGRAPHING CONDITION |
| 6 | MOUTH STOPPED | EXEMPT FROM PHOTOGRAPHING CONDITION |

FIG. 7B

| JUDGMENT ORDER (N) | PHOTOGRAPHING CONDITION ITEM | PHOTOGRAPHING CONDITION CONTENT |
|---|---|---|
| 1 | STOPPED | LEVEL BAR INDICATING 4 OR MORE |
| 2 | SMILED | LEVEL BAR INDICATING 5 |
| 3 | SOUND DETECTED | EXEMPT FROM PHOTOGRAPHING CONDITION |
| 4 | FACED CAMERA | LEVEL BAR INDICATING 4 OR MORE |
| 5 | EYES OPENED | EXEMPT FROM PHOTOGRAPHING CONDITION |
| 6 | MOUTH STOPPED | EXEMPT FROM PHOTOGRAPHING CONDITION |

FIG. 7C

| JUDGMENT ORDER (N) | PHOTOGRAPHING CONDITION ITEM | PHOTOGRAPHING CONDITION CONTENT |
|---|---|---|
| 1 | STOPPED | LEVEL BAR INDICATING 4 OR MORE |
| 2 | SMILED | LEVEL BAR INDICATING 2 OR LESS |
| 3 | SOUND DETECTED | EXEMPT FROM PHOTOGRAPHING CONDITION |
| 4 | FACED CAMERA | LEVEL BAR INDICATING 4 OR MORE |
| 5 | EYES OPENED | EXEMPT FROM PHOTOGRAPHING CONDITION |
| 6 | MOUTH STOPPED | EXEMPT FROM PHOTOGRAPHING CONDITION |

| AUTO-SHUTTER | | |
|---|---|---|
| STOPPED | ★ ★ ★ | 32 |
| SMILED | ★ ★ ☆ | |
| SOUND DETECTED | ☆ ☆ ☆ | |
| FACED CAMERA | ★ ☆ ☆ | |
| EYES OPENED | ★ ★ ☆ | |
| MOUTH STOPPED | ☆ ☆ ☆ | |

FIG. 10A

| NUMBER OF ★ (BLACK STAR SIGN) S | PHOTOGRAPHING CONDITION CONTENT |
|---|---|
| 0 | EXEMPT FROM PHOTOGRAPHING CONDITION |
| 1 | LEVEL BAR INDICATING 3 OR MORE |
| 2 | LEVEL BAR INDICATING 4 OR MORE |
| 3 | LEVEL BAR INDICATING 5 |

FIG. 10B

| JUDGMENT ORDER (N) | PHOTOGRAPHING CONDITION ITEM | PHOTOGRAPHING CONDITION CONTENT |
|---|---|---|
| 1 | STOPPED | LEVEL BAR INDICATING 5 |
| 2 | SMILED | LEVEL BAR INDICATING 4 OR MORE |
| 3 | SOUND DETECTED | EXEMPT FROM PHOTOGRAPHING CONDITION |
| 4 | FACED CAMERA | LEVEL BAR INDICATING 3 OR MORE |
| 5 | EYES OPENED | LEVEL BAR INDICATING 4 OR MORE |
| 6 | MOUTH STOPPED | EXEMPT FROM PHOTOGRAPHING CONDITION |

FIG. 10C

| NUMBER OF ★ (BLACK STAR SIGN) S | PHOTOGRAPHING CONDITION CONTENT |
|---|---|
| 0 | LEVEL BAR INDICATING 2 OR LESS |
| 1 | EXEMPT FROM PHOTOGRAPHING CONDITIONE |
| 2 | LEVEL BAR INDICATING 3 OR MORE |
| 3 | LEVEL BAR INDICATING 4 OR MORE |

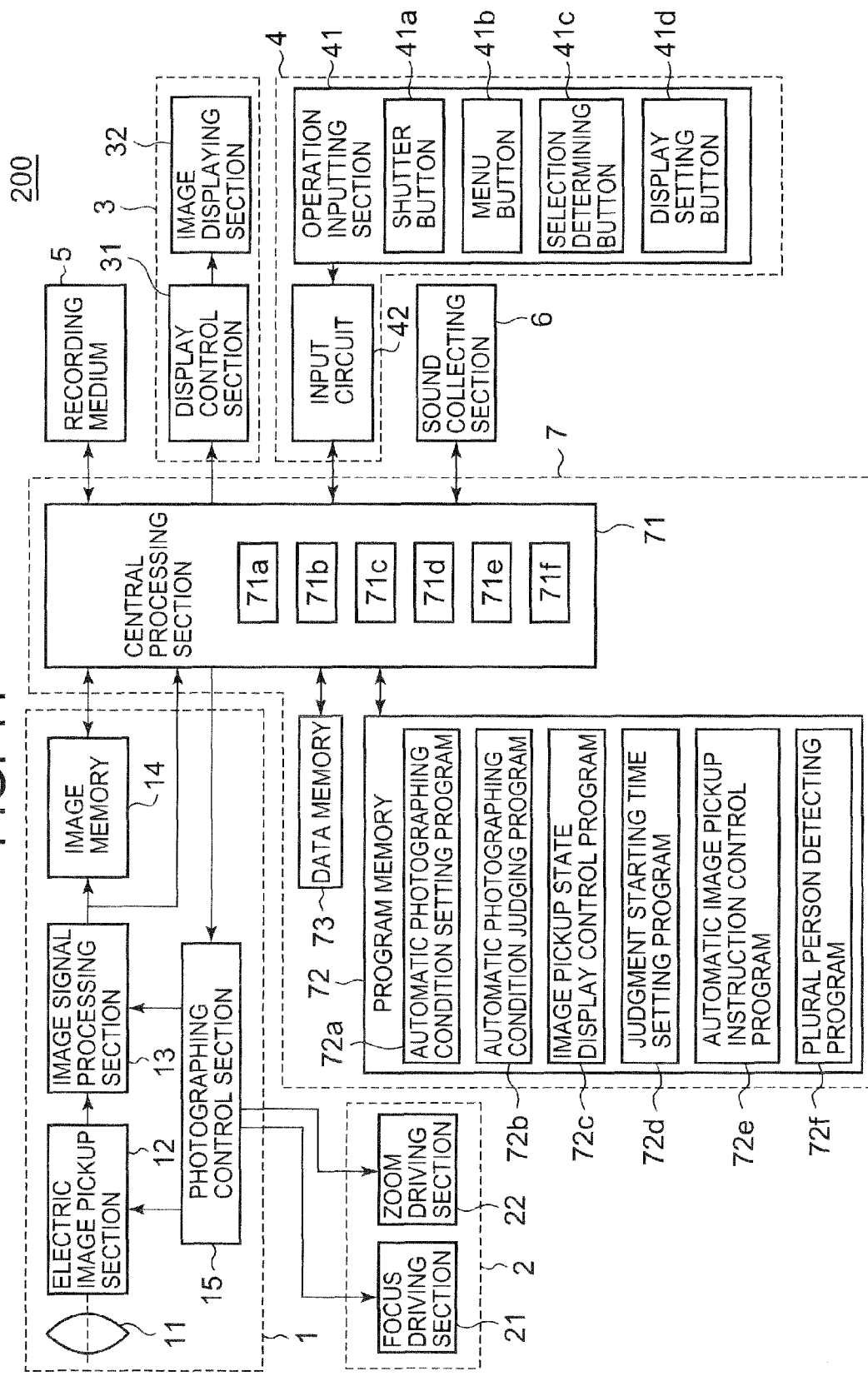

FIG. 12A

| JUDGMENT ORDER | PERSON NUMBER | PHOTOGRAPHING CONDITION ITEM | PHOTOGRAPHING CONDITION CONTENT |
|---|---|---|---|
| 1 | 1 | STOPPED | LEVEL BAR INDICATING 4 OR MORE |
| 2 | 1 | SMILED | LEVEL BAR INDICATING 5 |
| 3 | 1 | FACED CAMERA | LEVEL BAR INDICATING 4 OR MORE |
| 4 | 2 | STOPPED | LEVEL BAR INDICATING 4 OR MORE |
| 5 | 2 | SMILED | LEVEL BAR INDICATING 5 |
| 6 | 2 | FACED CAMERA | LEVEL BAR INDICATING 4 OR MORE |
| 7 | 3 | STOPPED | LEVEL BAR INDICATING 4 OR MORE |
| 8 | 3 | SMILED | LEVEL BAR INDICATING 5 |
| 9 | 3 | FACED CAMERA | LEVEL BAR INDICATING 4 OR MORE |
| ⋮ | ⋮ | ⋮ | ⋮ |

FIG. 12B

| JUDGMENT ORDER | PERSON NUMBER | PHOTOGRAPHING CONDITION ITEM | PHOTOGRAPHING CONDITION CONTENT |
|---|---|---|---|
| 1 | 1 | STOPPED | LEVEL BAR INDICATING 4 OR MORE |
| 2 | 2 | STOPPED | LEVEL BAR INDICATING 4 OR MORE |
| 3 | 3 | STOPPED | LEVEL BAR INDICATING 4 OR MORE |
| 4 | 1 | FACED CAMERA | LEVEL BAR INDICATING 4 OR MORE |
| 5 | 2 | FACED CAMERA | LEVEL BAR INDICATING 4 OR MORE |
| 6 | 3 | FACED CAMERA | LEVEL BAR INDICATING 4 OR MORE |
| 7 | 1 | SMILED | LEVEL BAR INDICATING 5 |
| 8 | 2 | SMILED | LEVEL BAR INDICATING 5 |
| 9 | 3 | SMILED | LEVEL BAR INDICATING 5 |
| ⋮ | ⋮ | ⋮ | ⋮ |

IMAGE PICKUP APPARATUS PERFORMING AUTOMATIC PHOTOGRAPHING PROCESSING, IMAGE PICKUP METHOD AND COMPUTER-READABLE RECORDING MEDIUM RECORDED WITH PROGRAM THEREOF

BACKGROUND OF THE INVENTION

1. Field of the Invention

The present invention relates to an image pickup apparatus performing a photographing of a subject automatically, the image pickup method, and a computers readable recording medium recorded with a program thereof.

2. Description of Related Art

Conventionally, an image pickup apparatus has been known, which performs photographing automatically when all of the subject people come to face to the image pickup apparatus at the time of photographing a group photograph by detecting the eyes of the subjects. Thereby, a photograph in a state in which all the people face to the image pickup apparatus can be obtained.

SUMMARY OF THE INVENTION

Accordingly, it is an object of the present invention to provide an image pickup apparatus, an image pickup method, and a computer-readable recording medium recorded with a program thereof, which enable a user to obtain a desired photographed image easily.

To achieve at least one of the above objects, according to a first aspect of the present invention, there is provided an image pickup apparatus comprising:

an image pickup section to pick up a subject image;

a condition setting section to arbitrarily set at least one automatic photographing condition among a plurality of kinds of automatic photographing conditions;

a condition judging section to judge whether the automatic photographing condition set by the condition setting section is satisfied for recording the subject image picked up by the image pickup section or not; aid an instruction control section to instruct the subject image picked up by the image pickup section to be recorded when the set automatic photographing condition is judged to be satisfied by the condition judging section.

According to a second aspect of the present invention, there is provided a recording medium to store a computer-executable program to enable a computer of an image pickup apparatus comprising an image pickup section to pick up a subject image to perform as:

a condition setting section to arbitrarily set at least one automatic photographing condition among a plurality of kinds of automatic photographing conditions;

a condition judging section to judge whether the automatic photographing condition set by the condition setting section is satisfied for recording the subject image picked up by the image pickup section or not; and an instruction control section to instruct the subject image picked up by the image pickup section to be recorded when the set automatic photographing condition is judged to be satisfied by the condition judging section.

According to a third aspect of the present invention, there is provided an image pickup method of an image pickup apparatus comprising an image pickup section to pick up a subject image, comprising:

arbitrarily setting at least one automatic photographing condition among a plurality of kinds of automatic photographing conditions;

judging whether the automatic photographing condition set in the setting is satisfied for recording the subject image picked up by the image pickup section or not; and instructing the subject image picked up by the image pickup section to be recorded when the set automatic photographing condition is judged to be satisfied in the judging.

BRIEF DESCRIPTION OF THE DRAWINGS

FIG. 7A is a diagram schematically showing an example of automatic photographing conditions stored in a data memory of the image pickup apparatus of FIG. 1;

FIG. 7B is a diagram schematically showing an example of automatic photographing conditions stored in the data memory of the image pickup apparatus of FIG. 1;

FIG. 7C is a diagram schematically showing an example of automatic photographing conditions stored in the data memory of the image pickup apparatus of FIG. 1;

FIG. 8 is a view schematically showing an example of an automatic photographing condition setting screen displayed in an image displaying section of an image pickup apparatus of a first modification;

FIG. 10A is a diagram showing an example of correspondence relations between the degrees of importance of selectable automatic photographing conditions and judgment standards according to the states of level bars;

FIG. 10B is a diagram schematically showing an example of the automatic photographing conditions stored in the data memory of the image pickup apparatus of FIG. 8;

FIG. 10C is a diagram showing an example of correspondence relations between the degrees of importance of the selectable automatic photographing conditions and the judgment standards according to the states of the level bars;

FIG. 11 is a block diagram showing the schematic configuration of an image pickup apparatus of a second modification;

FIG. 12A is a diagram schematically showing an example of automatic photographing conditions stored in a data memory of the image pickup apparatus of FIG. 11; and FIG. 12B is a diagram schematically showing an example of the automatic photographing conditions stored in the data memory of the image pickup apparatus of FIG. 11.

DETAILED DESCRIPTION OF THE PREFERRED EMBODIMENTS

In the following, concrete modes of the present invention will be described with reference to the attached drawings. However, the scope of the invention is not limited to the shown examples.

Figure 1:
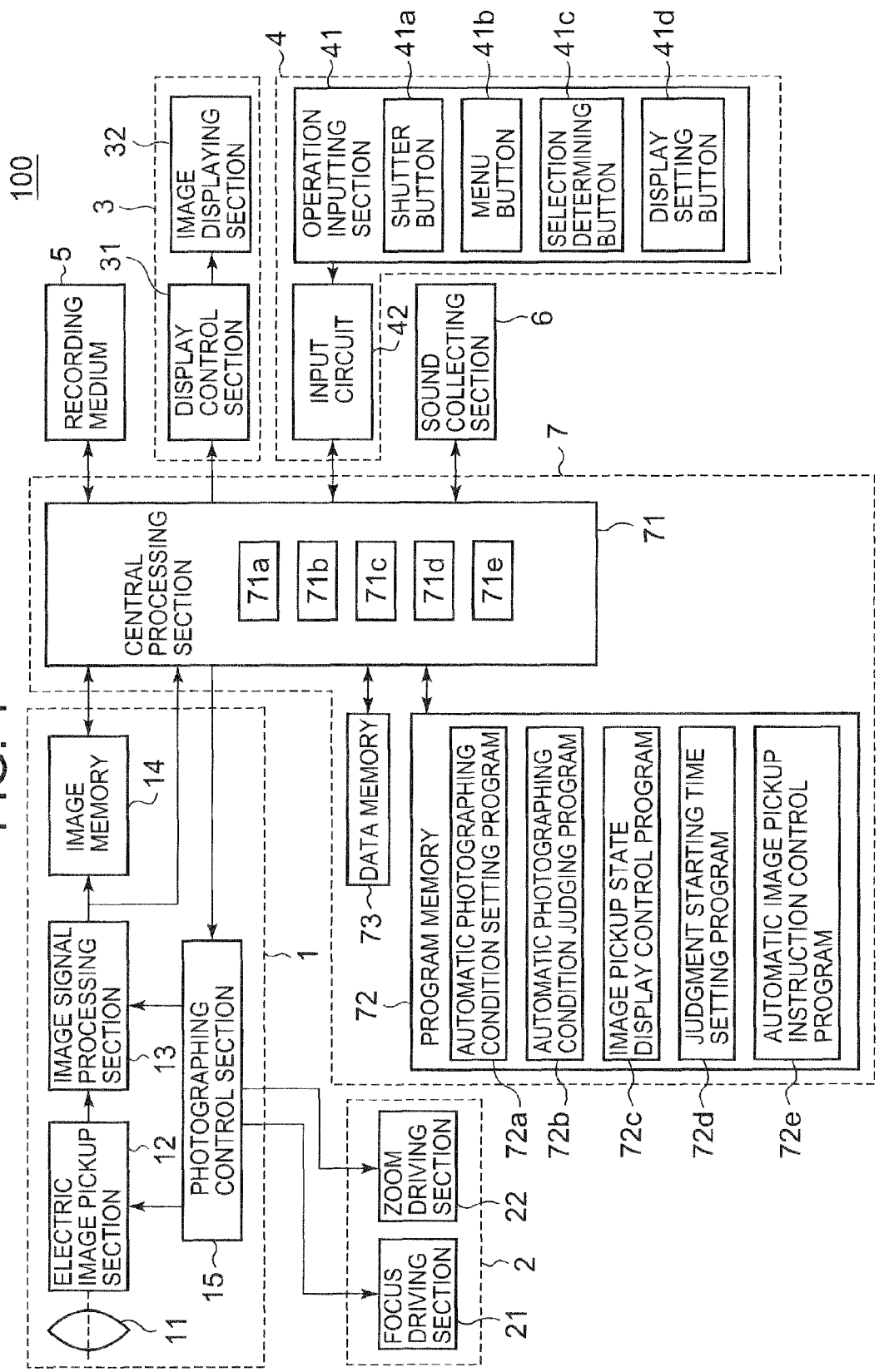
FIG. 1 is a block diagram showing the schematic configuration of an image pickup apparatus of a first embodiment to which the present invention is applied.

FIG. 1 is a block diagram showing the schematic configuration of an image pickup apparatus 100 of an embodiment to which the present invention is applied.

First Embodiment

The image pickup apparatus 100 of a first embodiment arbitrarily sets at least one selectable automatic photographing condition among a plurality of kinds of selectable automatic photographing conditions to perform auto-shutter photographing processing.

More concretely, the image pickup apparatus 100 uses the plurality of kinds of selectable automatic photographing conditions to be able to set an automatic photographing condition arbitrarily. When the automatic photographing condition is satisfied, auto-shutter photographing processing is performed.

(Description of Block Diagram)

As shown in FIG. 1, the image pickup apparatus 100 is composed of an image pickup section 1, an image pickup auxiliary section 2, a display section 3, an operation section 4, a recording medium 5, a sound collecting section 6, a control section 7, and the like.

The image pickup section 1 includes an image pickup lens group 11, an electric image pickup section 12, a picture signal processing section 13, an image memory 14, a photographing control section 15, and the like.

The image pickup lens group 11 is composed of a plurality of image pickup lenses.

The electric image pickup section 12 is composed of an image pickup device, such as a charge coupled device (CCD), a complementary metal-oxide semiconductor (CMOS), or the like, which converts a subject image passing through the image pickup lens group 11 into a two-dimensional image signal.

The picture signal processing section 13 performs predetermined image processing to an image signal output from the electric image pickup section 12.

The image memory 14 temporarily stores the image signal after the image processing.

The photographing control section 15 controls the electric image pickup section 12 and the picture signal processing section 13 under the control of a central processing section 71. To put it concretely, the photographing control section 15 makes the electric image pickup section 12 picks up a subject for a predetermined exposure time, and controls the execution of the processing of reading an image signal from the image pickup region of the electric image pickup section 12 at a predetermined frame rate.

The image pickup section 1 of the configuration mentioned above constitutes an image pickup section to pick up a subject, and to obtain recording image data (an image signal).

The image pickup auxiliary section 2 is driven when the image pickup section 1 picks up a subject. The image pickup auxiliary section 2 is composed of a focus driving section 21, a zoom driving section 22, and the like.

The focus driving section 21 drives a focus mechanism section (not shown) connected to the image pickup lens group 11.

The zoom driving section 22 drives a zoom mechanism section (riot shown) connected to the image pickup lens group 11.

Incidentally, the focus driving section 21 and the zoom driving section 22 are connected to the photographing control section 15, and perform their driving under the control of the photographing control section 15.

Figure 3A:
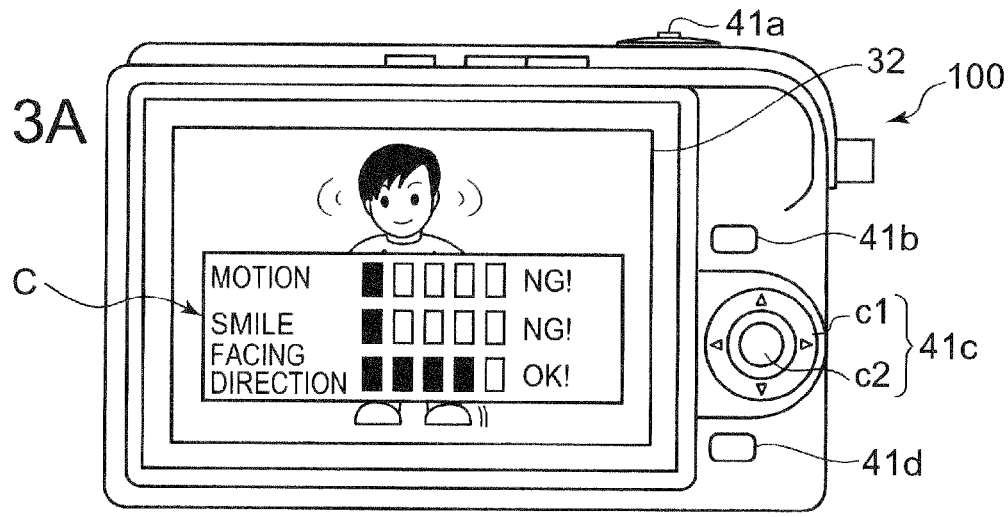
FIG. 3A is a rear view of the image pickup apparatus of FIG. 1 and a view schematically showing an example of a screen pertaining to auto-shutter photographing processing.

The display section 3 displays an image picked up by the image pickup section 1, and is placed so as to expose the display screen of the display section 3 on the rear side of the image pickup apparatus 100 (see FIG. 3A and the like). Moreover, the display section 3 is equipped with, for example, a display control section 31 and an image displaying section 32.

The display control section 31 includes a video memory (not shown) to temporarily save the display data which is suitably output from the central processing section 71.

The image displaying section 32 displays a predetermined image and information on a display screen on the basis of an output signal from the display control section 31.

Figure 2:
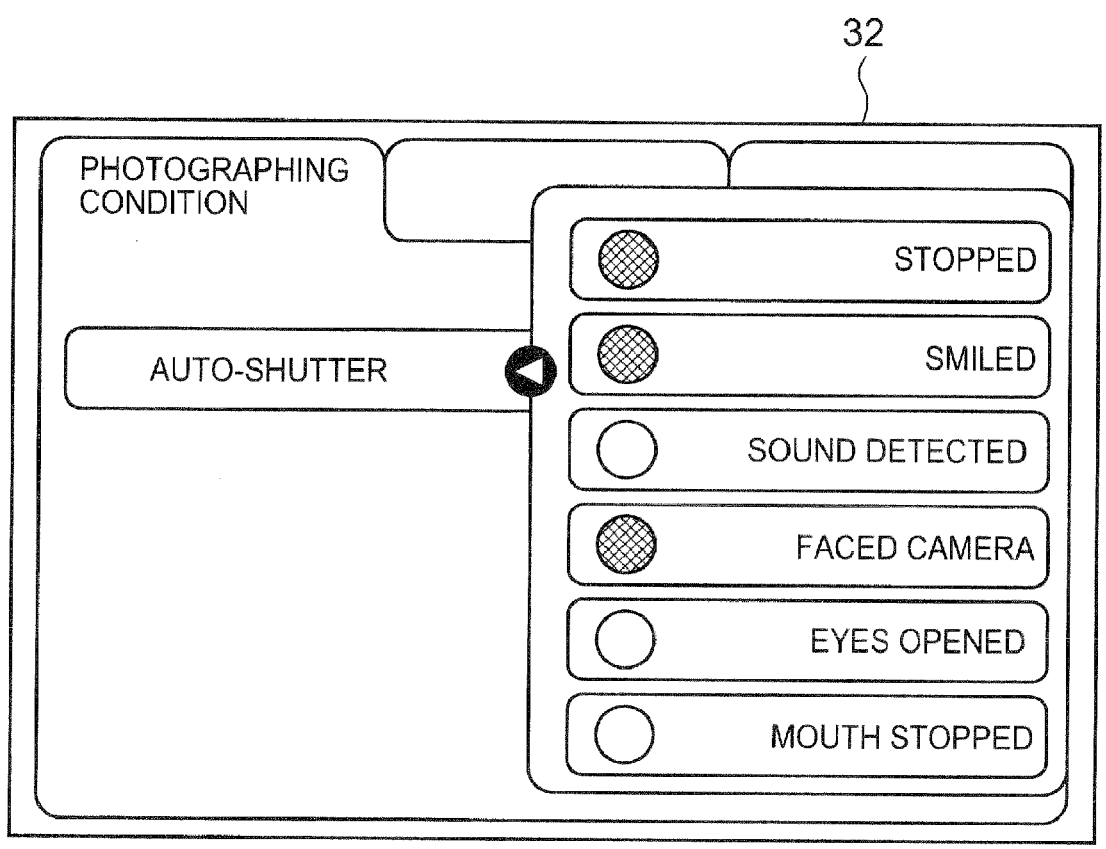
FIG. 2 is a view schematically showing an example of an automatic photographing condition setting screen displayed in an image displaying section of the image pickup apparatus of FIG. 1.

That is, the image displaying section 32 displays an automatic photographing condition setting screen G1 (see FIG. 2) by automatic photographing condition setting processing (the details of which will be described later). Here, as shown in FIG. 2, the automatic photographing condition setting screen G1 associates the items of a plurality kinds of selectable automatic photographing conditions with selecting buttons (which are displayed as outlined circles) to select each of the items. The items are defined as the candidates of automatic photographing conditions capable of being selected and set, such as "Stopped", "Smiled", "Sound Detected", "Faced Camera", "Eyes Opened", and "Mouth Stopped". Then, by selecting and setting desired items, such as "Stopped", "Smiled", and "Faced Camera" among the plurality of kinds of items of the automatic photographing conditions, the above mentioned outlined circles (including no dots) are changed to colored circles (dot displays) colored in a predetermined color (see FIG. 2).

Incidentally, the item "Smiled" currently selected on the basis of a user's predetermined operation of a cursor button c1 among the plurality of kinds of the items of selectable automatic photographing conditions is made to be a display (dot display) in which the background portion thereof is colored in a predetermined color.

Moreover, the image displaying section 32 displays a preview image (as a live view), the preview image being picked up by the image pickup section 1, and sequentially displays an image pickup time state screen C of an image pickup state related to the automatic photographing condition set in the automatic photographing condition setting processing (the details of which will be described later) in real time at this time (see FIGS. 3A-3C).

To put it concretely, the image pickup time state screen C performs the on-screen display (OSD) of the changes of the image pickup state according to the set selectable automatic photographing conditions (such as "Stopped", "Smiled", and "Faced Camera"; see FIGS. 3A-3C) in a level bar form. For example, as shown in FIGS. 3A-3C, the image pickup time state screen C displays each of the items of "Motion" associated with the selectable automatic photographing condition "Stopped", "smile" associated with the selectable automatic photographing condition "Smiled", and "facing direction" associated with the selectable automatic photographing condition "Faced Camera" in five-step levels at a slightly lower position of the image displaying section 32. Then, when each item of the selectable automatic photographing conditions is judged to satisfy a predetermined standard value in the selectable automatic photographing condition judging processing (the details of which will be described later), then the left-side four level bars out of the five-step level bars corresponding to the item are changed to be in a colored state, and "OK!" is displayed on the right side thereof. Moreover, when an item is judged to be almost completely satisfied, then all of the five level bars corresponding to the item are changed to be in the colored state, and "Perfect!" is displayed on the right side (see FIG. 3C). On the other hand, when any of the items is judged not to satisfy to the predetermined standard value, then any of the level bars corresponding to the item is not colored according to the unsatisfied degree, or one to three level bars from the left side in order are changed to be in the colored state, and "NG!" is displayed on the right side thereof (see FIGS. 3A and 3B).

Moreover, the image displaying section 32 temporarily displays a recording image (subject image) for the confirmation of the recording image recorded on the recording medium 5 after the image pickup of the subject by the image pickup section 1, and at this time, the image displaying section 32 displays an after-image pickup state screen pertaining to the image pickup state related to the automatic photographing condition (or the selectable automatic photographing condition) together with the recording image as an after-image pickup state displaying section (after-image pickup state displaying section). The data pertaining to the image pickup state related to the automatic photographing condition (or the selectable automatic photographing condition) displayed at this time is stored in the recording medium 5 together with the photographed image. Incidentally, the after-image pickup state screen may be, for example, the almost same one as the image pickup time state screen C when the recording image of the subject has been instructed (see FIG. 3C).

Hereby, the image pickup state at the time of actual image pickup can be grasped more suitably after the image pickup of a subject.

The image pickup time state screen C and the after-image pickup state screen which is almost the same as the image pickup time state screen C, are adapted to be able to switch a plurality of display forms including turning on and off of a display by, for example, performing a predetermined operation of a display setting button 41d which will be described later. The following settings can be adapted for displaying the recording images. That is, only a photographed subject image may be displayed as the recording image, or only the after-image pickup state screen which is almost the same as the image pickup time state screen C, may be displayed as the recording image.

The operation section 4 is the one for performing predetermined operations of the image pickup apparatus 100. The operation section 4 is equipped with an operation inputting section 41, an input circuit 42, and the like.

The operation inputting section 41 is composed of a shutter button 41a, a menu button 41b, a selection determining button 41c, the display setting button 41d, and the like.

The shutter button 41a is provided, for example, on the top surface side of the image pickup apparatus 100 (see FIG. 3A and the like), and instructs the image pickup section 1 to pick up a subject.

The menu button 41b is provided, for example, on the rear side of the image pickup apparatus 100 (see FIG. 3A and the like), and instructs the display of various menus of the auto-shutter photographing processing, the self-timer photographing processing, and the like.

The selection determining button 41c is provided, for example, on the lower side of the menu button 41b (see FIG. 3A and the like), and is equipped with the cursor button c1 for performing the selection of various items, an enter button c2, which is provided on the inner part of the cursor button c1 for determining the item selected by an operation of the cursor button c1, and the like.

The display setting button 41d is provided, for example, on the lower side of the selection determining button 41c (see FIG. 3A and the like) for switching the display content displayed in the image displaying section 32.

The input circuit 42 is the one for inputting an operation signal to the central processing section 71, the operation signal being output and input from the operation inputting section 41.

The recording medium 5 is composed of, for example, a card type nonvolatile memory (flash memory), a hard disk or the like.

Moreover, the recording medium 5 records the automatic photographing condition set in the automatic photographing condition setting processing (the details of which will be described later), the recording image data generated by the image pickup section 1, and the image pickup state of a subject related to the automatic photographing condition, that is, an image pickup state of whether the image pickup state has been "OK!," "Perfect", or the like, in the state of associating them with one another after the image pickup of the subject with the image pickup section 1.

Here, the recording medium 5 constitutes a photographing condition recording section to record the automatic photographing conditions and the recording image data in a state of associating them with each other, and also constitutes an image pickup state recording section to record the image pickup states and the recording image data in a state of associating them with each other.

The sound collecting section 6 is equipped with, for example, a microphone, an amplifier, and the like, although their illustration is omitted. Moreover, when the sound collecting section 6 collects a predetermined sound produced from the periphery in the state in which the item "Sound Detected" is selected and set as the automatic photographing condition in the auto-shutter photographing processing, then the sound collecting section 6 outputs a predetermined photographing instruction signal to the central processing section 71.

Furthermore, the following configuration may be adopted: the sounds of a specific person or a specific key word are recorded in advance, and then the sound authentication of recording data is performed to display the sound collecting level based on the sounds of the specific person, or the specific key word, or their combination as an image pickup state.

The control section 7 is the one to control each section of the image pickup apparatus 100. The control section 7 is composed of the central processing section 71, a program memory 72, a data memory 73, and the like.

The central processing section 71 performs various control operations in accordance with various processing programs for the image pickup apparatus 100, which programs are stored in the program memory 72.

Incidentally, the central processing section 71 may be equipped with a cache memory to store the program read from the program memory 72, although the cache memory is not shown.

The data memory 73 is composed of, for example, a flash memory or the like, and temporarily stores the data to be processed by the central processing section 71, and the like.

The program memory 72 stores various programs and data that are necessary for the operation of the central processing section 71. To put it concretely, the program memory 72 stores an automatic photographing condition setting program 72a, an automatic photographing condition judging program 72b, an image pickup state display control program 72c, a judgment starting time setting program 72d, an automatic image pickup instruction control program 72e, and the like.

Further, the central processing section 71 comprises an automatic photographing condition setting program processing section 71a corresponding to the automatic photographing condition setting program 72a, an automatic photographing condition judging program processing section 71b corresponding to the automatic photographing condition judging program 72b, an image pickup state display control program processing section 71c corresponding to the image pickup state display control program 72c, a judgment starting time setting program processing section 71d corresponding to the judgment starting time setting program 72d, an automatic image pickup instruction control program processing section 71e corresponding to the automatic image pickup instruction control program 72e, and the like.

(Description of Program)

The automatic photographing condition setting program 72a is a program for realizing the function of automatic photographing condition setting processing to arbitrarily set at least one selectable automatic photographing condition among a plurality of kinds of selectable automatic photographing conditions. To put it concretely, the central processing section 71 executes the automatic photographing condition setting program 72a. When a user performs predetermined operations of the menu button 41b of the operation inputting section 41 to select the auto-shutter photographing processing, the image displaying section 32 displays the automatic photographing condition setting screen G1. The user arbitrarily selects and sets at least two selectable automatic photographing conditions (for example, "Stopped", "Smiled", and "Faced Camera"; see FIG. 2) among the plurality of kinds of selectable automatic photographing conditions by the predetermined operations of the selection determining button 41c such as the cursor button c1 and the enter button c2. A supplementary description is added here. When at least one selectable automatic photographing condition is selected, then the automatic photographing condition setting processing can operate. But, at least two selectable automatic photographing conditions are selected and set here in order to make it easy to understand the description of the embodiment and the configuration of the present invention.

Here, the central processing section 71 and the operation inputting section 41 constitute a condition setting section to arbitrarily set at least one selectable automatic photographing condition among a plurality of kinds of selectable automatic photographing conditions. By setting an arbitrary selectable automatic photographing condition among the plurality of kinds of selectable automatic photographing conditions here, the automatic photographing condition is determined here.

Moreover, it is desirable to configure the automatic photographing conditions so as to able to store the setting of the automatic photographing conditions that has been once performed. Furthermore, it is desirable to store only the setting that has been performed last. Hereby, the convenience of a user is improved.

Here, the plurality of kinds of selectable automatic photographing conditions means the ones classified by each item, and does not consider the degree of importance pertaining to the judgment of whether each item is satisfied or not (the details of which will be described in a first modification) To put it concretely, as the selectable automatic photographing conditions, for example, "Stopped", "Smiled", "Sound Detected", "Faced Camera", "Eyes Opened", "Mouth Stopped", and the like, can be cited.

The automatic photographing condition judging program 72b makes the central processing section 71 function as a condition judging section. That is, the central processing section 71 judges whether the automatic photographing condition set by the automatic photographing condition setting program is satisfied or not. Moreover, the automatic photographing condition judging program 72b includes a selectable automatic photographing condition judging program and a selectable automatic photographing condition counting program, which will be described later. That is, the reason is that, when each selectable automatic photographing condition becomes a predetermined state (for example, when all of the selectable automatic photographing conditions are satisfied, or a predetermined number of the selectable automatic photographing conditions is satisfied), the automatic photographing condition is judged to be satisfied.

The selectable automatic photographing condition judging program makes the central processing section 71 function as an individual judgment section. That is, the selectable automatic photographing condition judging program is a program for making the central processing section 71 realize the function pertaining to the processing of judging whether each selectable automatic photographing condition set in the automatic photographing condition setting processing is satisfied or not. To put it concretely, the central processing section 71 executes the selectable automatic photographing condition judging program to judge whether a plurality of automatic photographing conditions, such as the automatic photographing conditions of "Stopped", "Smiled", "Faced Camera", and the like, which have been set in the automatic photographing condition setting processing after a user's depression operation of the shutter button 41a, are satisfied or not.

Figure 4A:
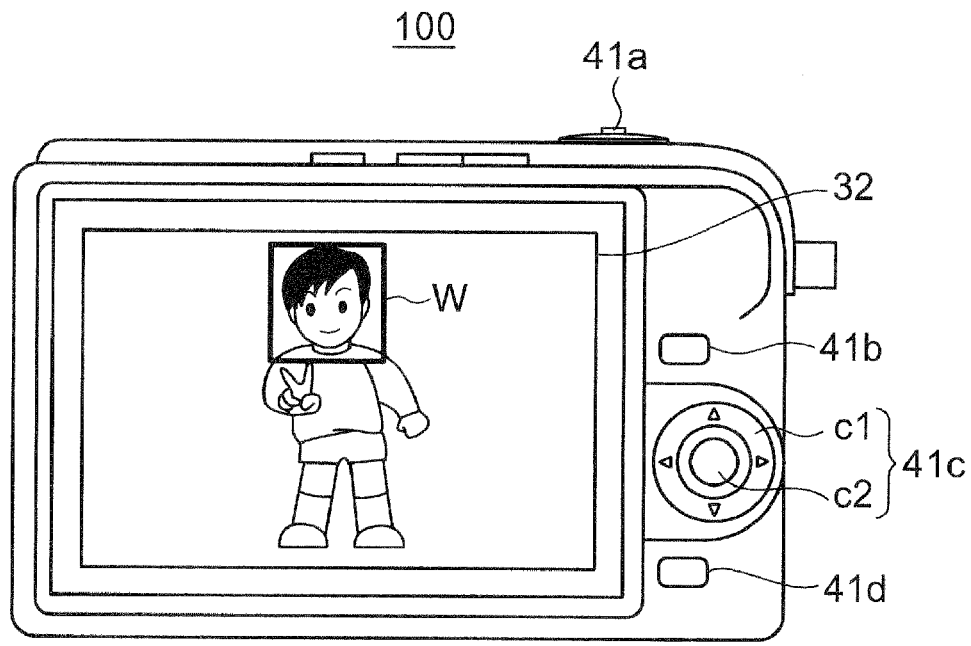
FIG. 4A is a rear view of the image pickup apparatus of FIG. 1 and a view schematically showing an example of the screen pertaining to the auto-shutter photographing processing.
Figure 4B:
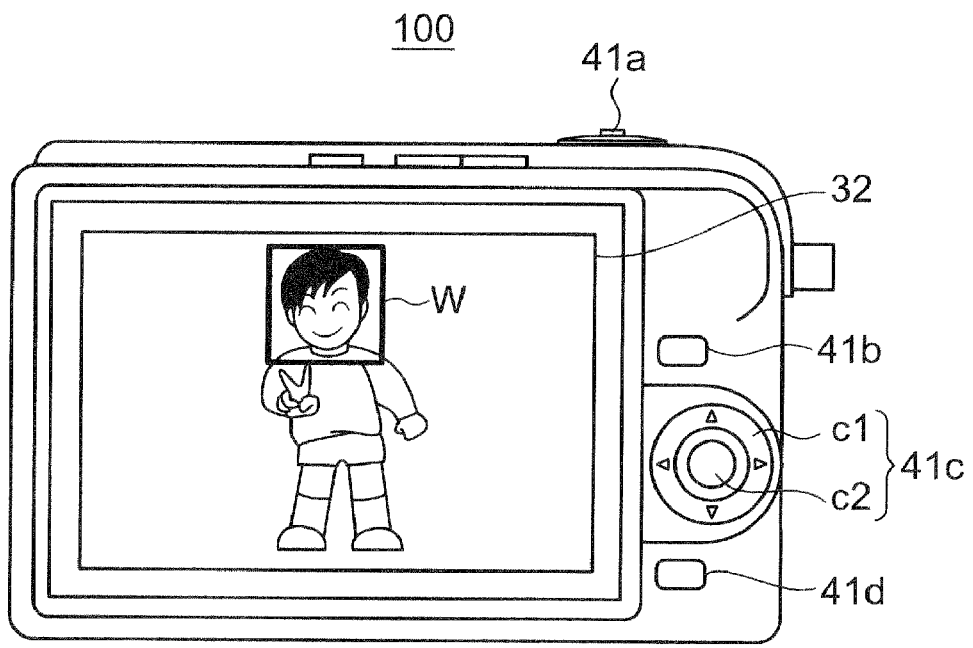
FIG. 4B is a rear view of the image pickup apparatus of FIG. 1 and a view schematically showing an example of the screen pertaining to the auto-shutter photographing processing.

For example, when the selectable automatic photographing condition "Smiled" is judged to be satisfied or not, then, as shown in FIGS. 4A and 4B, the fact of whether a subject is smiling or not is judged by recognizing the expression of a face (a part on which an almost rectangular frame W is displayed so as to be superimposed in FIGS. 4A and 4B) detected by predetermined face detecting processing. For example, when the subject is judged not to be smiling (see FIG. 4A), then the selectable automatic photographing condition is not satisfied. On the other hand, when the subject is judged to have smiled (see FIG. 4B), the selectable automatic photographing condition is judged to be satisfied.

Incidentally, as described below, it is also possible to configure the judgment of the satisfaction of the selectable automatic photographing condition so as to be performed in a predetermined state between the smiling state and the not-smiling state.

Incidentally, the face detecting processing is the following processing here: a face searching frame is scanned in predetermined directions in one piece of recording image data (image frame) among a plurality of pieces of recording image data to specify characterizing portion (face parts) corresponding to an eye, a nose, a mouth, and the like; it is judged whether the recording image data is that of a face or not on the basis of the positional relations between each of the face parts; and when the recording image data is judged to be a face, the searching frame region is detected as a face region. But, the face detecting processing may not be limited to the above processing.

Moreover, the selectable automatic photographing condition "Stopped" judges whether the subject has stopped or not on the basis of whether the blur of the subject has disappeared or not on the basis of, for example, the recording image data generated by the image pickup section 1.

Moreover, "Eyes Opened", "Mouth Stopped", and "Faced Camera" are judged on the basis of the expression recognition of a face detected by the face detecting processing almost similarly to the judgment about "Smiled".

Moreover, "Sound Detected" judges whether a predetermined sound is produced or not on the basis of a sound collecting result by the sound collecting section 6.

The selectable automatic photographing condition counting program is one for counting the number of the judgment results obtained by judging that the selectable automatic photographing condition is satisfied by the selectable automatic photographing condition judging program.

The automatic photographing condition judging program 72b may judge whether the automatic photographing condition is satisfied or not on the basis of the counting by the selectable automatic photographing condition counting program.

The image pickup state display control program 72c makes the central processing section 71 function as a sequential display control section. That is, the image pickup state display control program 72c is a program for making the central processing section 71 realize the function pertaining to image pickup state displaying processing for displaying the image pickup time state screen C pertaining to the image pickup state related to the automatic photographing condition of a subject image picked up by the image pickup section 1 on the image displaying section 32 in real time on the basis of a judgment result of whether the automatic photographing condition is satisfied or not by the automatic photographing condition judging processing.

Figure 3B:
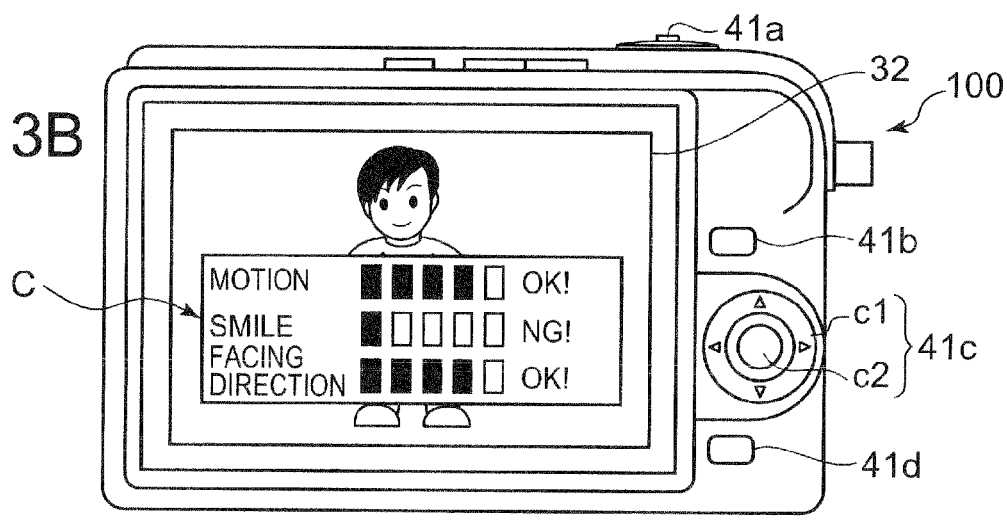
FIG. 3B is a rear view of the image pickup apparatus of FIG. 1 and a view schematically showing an example of the screen pertaining to the auto-shutter photographing processing.
Figure 3C:
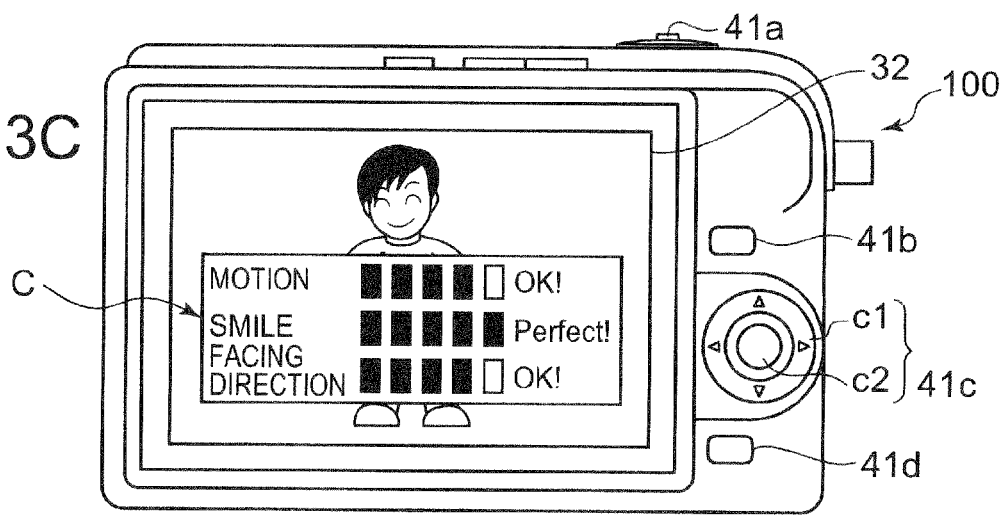
FIG. 3C is a rear view of the image pickup apparatus of FIG. 1 and a view schematically showing an example of the screen pertaining to the auto-shutter photographing processing.

To put it concretely, as shown in FIGS. 3A-3C, the central processing section 71 executes the image pickup state display control program 72c, and thereby the central processing section 71 displays the image pickup time state screen C to express each selectable automatic photographing condition in a five-step level according to the judgment result of whether to satisfy each automatic photographing condition or not by the automatic photographing condition judging processing. For example, when a subject is moving, then the situation is judged not to satisfy the selectable automatic photographing condition "Stopped" in the automatic photographing condition judging processing. Consequently, the level bars of "Motion" become the state in which one to three of them are colored (FIG. 3A shows the state in which only one level bar is displayed to be colored). On the other hand, when the movement of the subject stops, the situation is judged to satisfy the selectable automatic photographing condition "Stopped", and the level bars of "Motion" becomes the state in which four or more level bars are colored (FIGS. 3B and 3C show the states in which four level bars are displayed to be colored).

Here, the state of the level 4 may be supposed to be the state in which the motion of the subject is almost stopped, and the state of the level 5 may be supposed to be the state in which the state in which the motion of the subject is almost stopped is lasting for a predetermined time or longer. Alternately, the state of the level 4 may be supposed to be the state in which the motion of the subject is almost stopped, and the state of the level 5 may be supposed to be the state in which the motion of the subject is more steadily stopped than the state of the level 4.

Moreover, when a subject is not smiling, then the situation is judged not to satisfy the selectable automatic photographing condition "Smiled" in the automatic photographing condition judging processing. Consequently, the level bars of "smile" become the state in which one to three of them are colored (FIGS. 3A and 3B show the states in which only one level bar is displayed to be colored). On the other hand, when the subject is in a smiling state, the situation is judged to satisfy the selectable automatic photographing condition "Smiled", and the level bars of "smile" become the state in which four or more of them are colored (FIG. 3C shows a state in which all of the five level bars are displayed to be colored).

Here, the state of the level 4 may be supposed to be a smiling state, and the state of the level 5 may be supposed to be the state in which the smiling state has been lasting for a predetermined time or longer. Alternately, the state of the level 4 may be supposed to be the smiling state, and the state of the level 5 may be supposed to be a state in which the subject is more steadily smiling than the state of the level 4.

That is, the state of the level 5 may be supposed to be the state in which the state of the level 4 is lasting for the predetermined time or longer.

The judgment starting time setting program 72d is a program for making the central processing section 71 realize the function pertaining to the processing of setting the starting time of the judgment whether to satisfy the automatic photographing condition or not by the automatic photographing condition judging processing to a time after the lapse of a predetermined time from a predetermined operation. To put it concretely, the central processing section 71 executes the judgment starting time setting program 72d, and thereby when the self-timer photographing processing is selected on the basis of a user's predetermined operation of the menu button 41b of the operation inputting section 41, a self-timer function sets the starting time of the judgment of the automatic photographing condition to the time after the lapse of the predetermined time from the depression operation of the shutter button 41a.

Here, the central processing section 71 and the operation inputting section 41 constitutes a judgment starting time setting section to set the starting time of the judgment of the automatic photographing condition judging processing to the time after the lapse of the predetermined time from the predetermined operation.

The automatic image pickup instruction control program 72e makes the central processing section 71 function as an instruction control section. That is, the automatic image pickup instruction control program 72e is a program for making the central processing section 71 realize the function pertaining to the processing of instructing the image pickup of the recording image of a subject by the image pickup section 1 when the automatic photographing condition judging processing judges that a situation satisfies the automatic photographing conditions. To put it concretely, the central processing section 71 executes the automatic image pickup instruction control program 72*e*, and thereby when the automatic photographing conditions are judged to be satisfied in the automatic photographing condition judging processing, the central processing section 71 makes the image pickup section 1 pick up a recording image for image recording, and instructs the image pickup section 1 to obtain the recording image data of the recording image.

(Description of Flowchart)

Next, the auto-shutter photographing processing is described in detail with reference to FIGS. 5 and 6.

Figure 5:
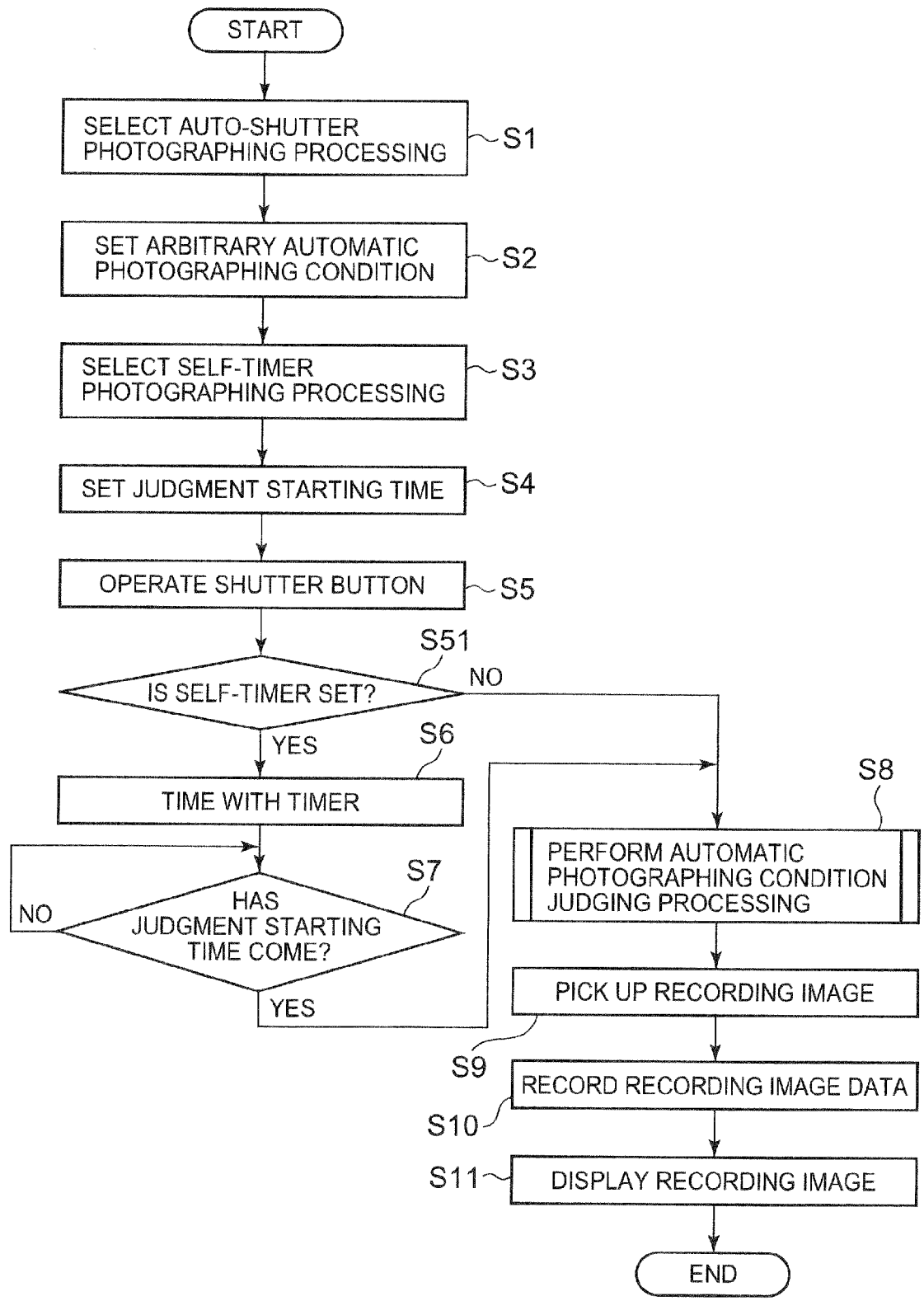
FIG. 5 is a flowchart showing an example of the operation pertaining to the auto-shutter photographing processing by the image pickup apparatus of FIG. 1.

Here, FIG. 5 is a flowchart showing an example of the operation pertaining to the auto-shutter photographing processing.

As shown in FIG. 5, first, when the auto-shutter photographing processing is selected on the basis of a user's predetermined operation of the menu button 41*b* of the operation inputting section 41 (Step S1), the central processing section 71 executes the automatic photographing condition setting program 72*a* in the program memory 72 to make the image displaying section 32 display the automatic photographing condition setting screen C1 therein, and arbitrarily sets a selectable automatic photographing condition among the plurality of kinds of selectable automatic photographing conditions on the basis of the predetermined operation of the selection determining button 41*c* to set the automatic photographing condition (Step S1; automatic photographing condition setting processing).

Incidentally, each item of "Stopped", "Smiled", "Sound Detected", "Faced Camera", "Eyes Opened", "Mouth Stopped", and the like, of the selectable automatic photographing conditions is numbered from 1 in order, and the items are temporarily stored in the data memory 73 (see FIGS. 7A-7C and the like).

Next, when the self-timer photographing processing is selected on the basis of a user's predetermined operation of the menu button 41*b* of the operation inputting section 41 (Step S3), then the central processing section 71 executes the judgment starting time setting program 72*d* in the program memory 72 to set the starting time of the judgment of the automatic photographing conditions (including the judgment of the selectable automatic photographing condition) to a time after the lapse of a predetermined time from the depression operation of the shutter button 41*a* (Step S4).

After that, the central processing section 71 judges whether the self-timer photographing processing is set or not (Step S51) on the basis of the user's predetermined operation of the shutter button 41*a* in the operation inputting section 41 (Step S5). When the self-timer photographing processing is set (Step S51; YES), then the central processing section 71 makes a not-shown timer start timing (Step S6), and judges whether the timed time has come to a predetermined set time (judgment starting time) or not (Step S7). Here, when the time is judged to have come to the judgment starting time (Step S7; YES), the central processing section 71 executes the automatic photographing condition judging program 72*b* in the program memory 72 to perform the automatic photographing condition judging processing to judge whether to satisfy the automatic photographing condition set in the automatic photographing condition setting processing or not (Step S8).

Moreover, when the self-timer photographing processing is not set at Step S51 (Step S51; NO), then the central processing section 71 performs the automatic photographing condition judging processing at Step S8.

In the following, the automatic photographing condition judging processing is described in detail with reference to FIG. 6.

Figure 6:
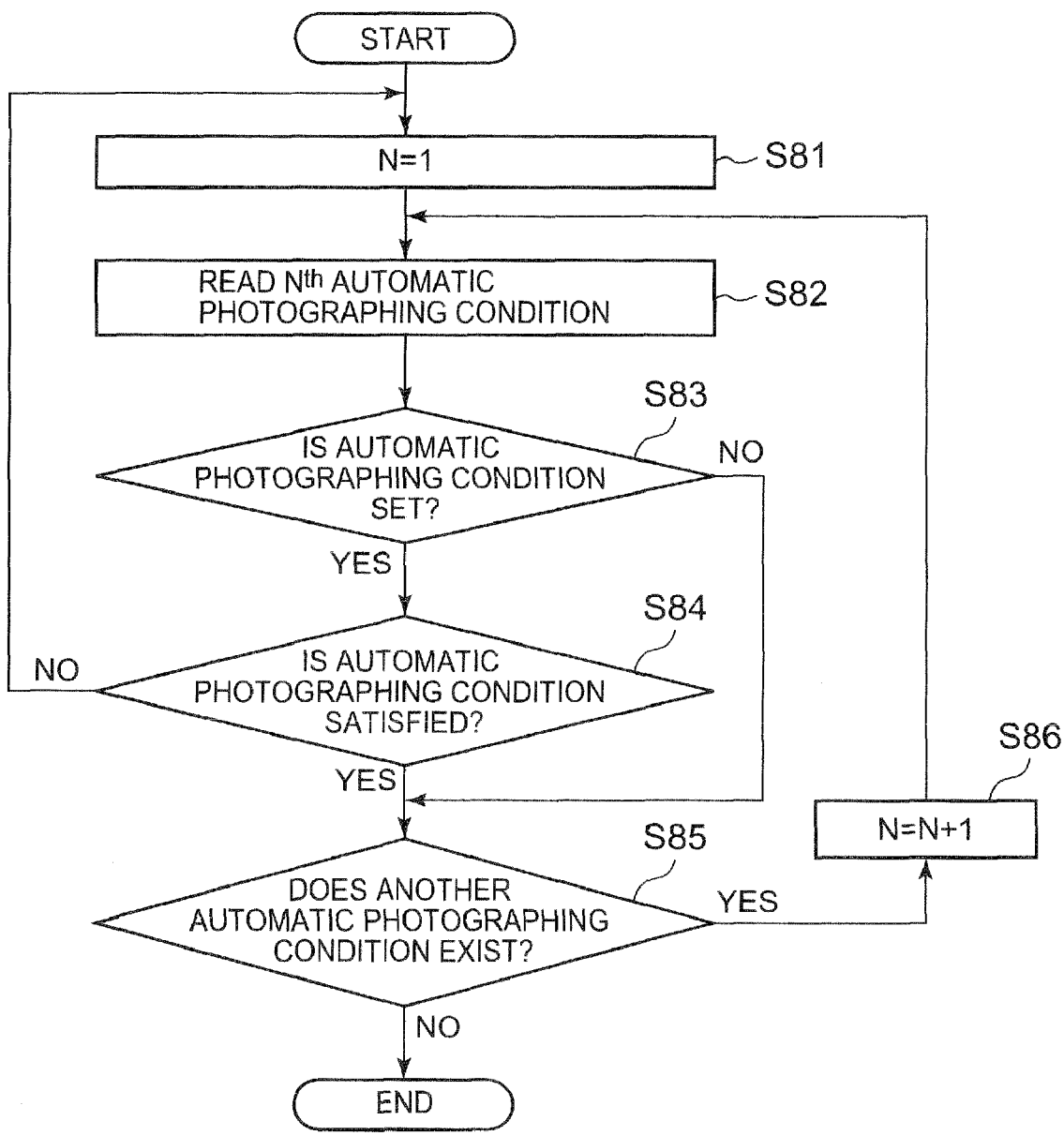
FIG. 6 is a flowchart showing an example of the operation pertaining to automatic photographing condition judging processing of the auto-shutter photographing processing of FIG. 5.

Here, FIG. 6 is a flowchart showing an example of the operation pertaining to the automatic photographing condition judging processing.

As shown in FIG. 6, in the automatic photographing condition judging processing, first, the central processing section 71 sets a number N pertaining to the judgment order of the automatic photographing condition (Step S81), and reads a first selectable automatic photographing condition (for example, "Stopped"; see FIG. 2) among the plurality of kinds of selectable automatic photographing conditions from the data memory 73 (Step S82) to judge whether the selectable automatic photographing condition is set or not (Step S83).

When it is judged that the first selectable automatic photographing condition is set at Step S83 (Step S83; YES), then the central processing section 71 judges whether the selectable automatic photographing condition is satisfied or not in a predetermined time (Step S84), and executes the image pickup state display control program 72*c* to make the image displaying section 32 display the image pickup time state screen C (see FIGS. 3A-3C) pertaining to the change of the image pickup state on the basis of the judgment result in real time (the displaying of the judging state).

Here, when it is judged that the automatic photographing condition is satisfied (Step S84; YES), then the central processing section 71 judges whether there is any other selectable automatic photographing condition that has not been subjected to the judgment processing yet among the plurality of kinds of selectable automatic photographing conditions or not (Step S85). At this time, when the first selectable automatic photographing condition is judged, it is judged to be "YES" at Step S85, and the central processing section 71 increments the number N pertaining to the judgment order of the selectable automatic photographing conditions by "+1" (Step S86) to move the processing to that at Step S82. Then, the central processing section 71 performs the succeeding processing of a second selectable automatic photographing condition (for example, "Smiled"; see FIG. 2).

On the other hand, when it is judged that there is no read set selectable automatic photographing condition at Step S83 (Step S83; NO), the central processing section 71 moves the processing to that at Step S85, and judges whether any other selectable automatic photographing condition exists or not (Step S85).

Moreover, when it is judged that the selectable automatic photographing condition is not satisfied at Step S84 (Step S84; NO), the central processing section 71 moves the processing to that at Step S81, and performs the succeeding processing of the first selectable automatic photographing condition.

When all of the plurality of kinds of selectable automatic photographing conditions have been judged in the way mentioned above and it is judged that no residual selectable automatic photographing conditions that have not been subjected to the judgment processing exist among the plurality of kinds of selectable automatic photographing conditions at Step S85 (Step S85; NO), then the central processing section 71 judges that the automatic photographing conditions are satisfied, and performs automatic photographing. To put it more concretely, the central processing section 71 executes the automatic image pickup instruction control program 72*e* in the program memory 72 to make the image pickup section 1 pick up the recording image for image recording (Step S9), and makes the recording medium 5 record the recording image data pertaining to the recording image (Step S10).

At this time, it is supposed that the automatic photographing conditions are also recorded in the state of being associated with the recording image data, and that the state data at the time of the satisfaction of the automatic photographing conditions indicating in which state each selectable automatic photographing condition has satisfied the automatic photographing conditions at the time of satisfying the automatic photographing conditions is also recorded in the state of being associated with the recording image data.

Hereby, when a photographed image is confirmed later, it becomes possible to confirm in which automatic photographing condition the photographed image has been photographed and in which state of the automatic photographing conditions at the time of the automatic photographing the photographed image has been photographed.

Then, the central processing section 71 executes a predetermined program (not shown) as an afterimage pickup state displaying control section, and temporarily displays an afterimage pickup state screen pertaining to the image pickup state related to the set automatic photographing condition together with the recording image for confirmation of the recording image in the image displaying section 32 (Step S11).

Incidentally, the display form of the screen of the recording image can be changed by the depression of the display setting button 41d as described above.

As described above, according to the image pickup apparatus 100 of the first embodiment, a plurality of kinds of the selectable automatic photographing conditions is arbitrarily set among a plurality of kinds of selectable automatic photographing conditions in the automatic photographing condition setting screen G1 in the auto-shutter photographing processing. When it is judged that all of the plurality of kinds of selectable automatic photographing conditions is satisfied, then the recording image pickup of the subject image by the image pickup section 1 is instructed. Consequently, the automatic photographing processing can be performed under the arbitrarily set automatic photographing conditions, and a photograph desired by a user can be easily obtained.

At this time, since the plurality of kinds of selectable automatic photographing conditions can be suitably combined, not only the photographs having less failures can be obtained by the automatic photographing, but also the photographs complying with user's wishes more can be obtained by changing the combinations of the selectable automatic photographing conditions suitably, and then it is possible to provide the more convenient image pickup apparatus 100.

Moreover, by displaying the image pickup state related to the automatic photographing condition of a subject image in the image displaying section 32 in real time, the present image pickup state is informed to a person operating the shutter button 41a, and it is possible to tell the unsatisfied automatic photographing conditions and the like to the person of a subject. Consequently, the image pickup of the subject can be performed more suitably.

Furthermore, after the image pickup of the subject, the automatic photographing conditions, the recording image data, and the image pickup state of the subject can be recorded in the recording medium 5 in the state of being associated with one another, and consequently a user can grasp the automatic photographing conditions of each piece of recording image data and the image pickup state of the subject. For example, in the present embodiment, the standard value of an automatic photographing condition is satisfied at the degree of four or more displayed level bars in a five-step level bar display. It is possible to judge whether the level of a automatic photographing condition is the "OK!" level, in which four level bars were displayed at the time of the image pickup of the image, or the "Perfect!" level, in which five level bars were displayed at the time of the image pickup of the image, by recording the image pickup state of the subject together with the automatic photographing condition.

Moreover, it is possible to set the starting time of the judgment of the automatic photographing conditions to a time after the elapse of the predetermined time after the depression operation of the shutter button 41a by the self-timer function, and consequently it can be prevented that the image pickup of a subject is performed immediately after the operation of the shutter button 41a.

For example, when a person who operates the shutter button 41a wants to be photographed together in a group photograph, the person who operates the shutter button 41a cannot be photographed when the image pickup of the subjects is performed immediately after the depression operation of the shutter button 41a. But, by shifting the operation timing of the shutter button 41a and the starting timing of the judgment of the automatic photographing conditions by the self-timer function, the person who operates the shutter button 41a can be photographed in the group photograph in an enough time.

Incidentally, in the embodiment described above, it is judged that a selectable automatic photographing condition is satisfied when a predetermined standard level or more is obtained in the judgment processing of each of the set selectable automatic photographing conditions, but the judgment of the satisfaction is not limited to the method. The selectable automatic photographing condition may also be judged to be satisfied in the case of according with a predetermined standard level or the case of being less than the predetermined level.

To put it concretely, for example, as shown in FIG. 7A, the condition of "level bar indicating 4 or more" may be set to the items of "Stopped", "Smiled", and "Faced Camera" among the plurality of selectable automatic photographing conditions. The conditions may be stored in the data memory 73. That is to say, the same level may be set to all of the selected automatic photographing conditions.

Further, as shown in FIG. 7B, the condition of "level bar indicating 4 or more" may be set to the items of "Stopped" and "Faced Camera" among the plurality of selectable automatic photographing conditions, and the condition of "level bar indicating 5" may be set to the item of "Smiled". The conditions may be stored in the data memory 73.

Moreover, as shown in FIG. 7C, the condition of "level bar indicating 4 or more" may be set to the items of "Stopped" and "Faced Camera" among the plurality of selectable automatic photographing conditions, and the condition of "level bar indicating 2 or less" may be set to the item of "Smiled". The conditions may be stored in the data memory 73.

In each of the FIGS. 7A, 7B and 7C, it is desirable that the judgment order (N) is the same as "N" counted in the flowchart shown in FIG. 6.

Incidentally, as for the item of "exempt from photographing condition", the flowchart shown in FIG. 6 may be configured so as to skip the processing thereof, thus the processing speed can be improved.

Hereby, the range of the selectable automatic photographing conditions can be widened, and a photograph complying with user's wishes more can be obtained.

For example, when a photograph without a smile, such as an identification photograph, is desired, the situation can be dealt with by a configuration in which the automatic photographing conditions are judged to be satisfied when the degree of the satisfaction to the selectable automatic photographing condition of "Smiled" becomes a predetermined level or less.

Incidentally, the present invention is not limited to the aforesaid embodiment. Various improvements and modifications of the design may be performed without departing from the sprit and the scope of the present invention.

In the following, modifications of the image pickup apparatus 100 will be described.

<First Modification>

The image pickup apparatus of a first modification sets a degree of importance to each of a plurality of kinds of selectable automatic photographing conditions to perform auto-shutter photographing processing by the use of the degrees of importance as image pickup instruction standards.

That is, although the setting (selection) of a selectable automatic photographing condition is performed at Step S2 in the embodiment described above, an arbitrarily selectable automatic photographing condition is first selected among all of the selectable automatic photographing conditions, and the degree of importance is set to the selected selectable automatic photographing condition as follows in the embodiment described above.

Incidentally, because the image pickup apparatus of the first modification is almost the same as the embodiment described above except for the configuration pertaining to the setting of the degrees of importance of the selectable automatic photographing conditions, the same configurations are denoted by the same reference numbers and their descriptions are omitted.

That is, here, the central processing section 71 executes the automatic photographing condition setting program 72a in the automatic photographing condition setting processing, and consequently the central processing section 71 makes the image displaying section 32 display an automatic photographing condition setting screen G2 to set the degree of importance (judgment standard) pertaining to the judgment whether to satisfy each of the plurality of kinds of selectable automatic photographing conditions or not on the basis of a predetermined operation of the selection determining button 41c, such as the cursor button c1 and the enter button c2.

To put it concretely, as shown in FIG. 8, the automatic photographing condition setting screen G2 expresses the degrees of importance of the items of the plurality of kinds of selectable automatic photographing conditions, such as "Stopped", "Smiled", "Sound Detected", "Faced Camera", "Eyes Opened", and "Mouth Stopped", by the numbers of stars ("white star sign" and "black star sign").

The larger the number of the "black star signs" of the displays (dot displays) colored by a predetermined color is, the higher of the degrees of importance of the selectable automatic photographing conditions are. When the degree of importance is made to be higher, an outlined (having no dot) "white star sign" becomes a "black star sign" of the display colored by the predetermined color (see FIG. 8). For example, the selectable automatic photographing condition "Stopped" has the number of dot display "black star signs" of three, which is the highest degree of importance in the screen G2; the selectable automatic photographing conditions "Smiled" and "Eyes Opened" each have the number of the dot display "black star signs" of two, which is the higher degree of importance next to the item "Stopped"; the selectable automatic photographing condition "Faced Camera" has the number of dot display "black star sign" of one, which is the higher degree of importance next to the items "Smiled" and "Eyes Opened"; and the selectable automatic photographing conditions "Sound Detected" and "Mouth Stopped" each have the number of dot display "black star sign" of zero, that is, having the number of the outlined "white star signs" of three, which is the lowest degree of importance.

Incidentally, the item "Smiled", which is currently selected on the basis of a predetermined operation of the cursor button c1 by a user, among the items of the plurality of kinds of selectable automatic photographing conditions is made to be a display (dot display), the background portion of which is colored by a predetermined color.

In this manner, the central processing section 71 and the operation inputting section 41 constitute a standard setting section to set an image pickup instruction standard pertaining to an image pickup instruction in the auto-shutter photographing processing to each of the plurality of kinds of selectable automatic photographing conditions.

Figure 9A:
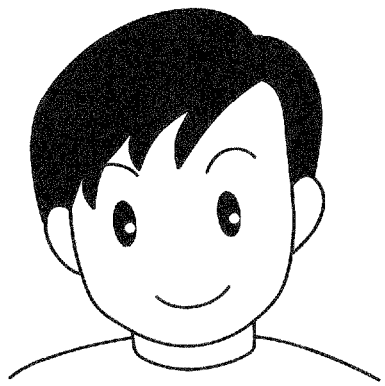
FIG. 9A is a schematic view of a subject for describing automatic photographing condition judging processing of the image pickup apparatus of FIG. 8.
Figure 9B:
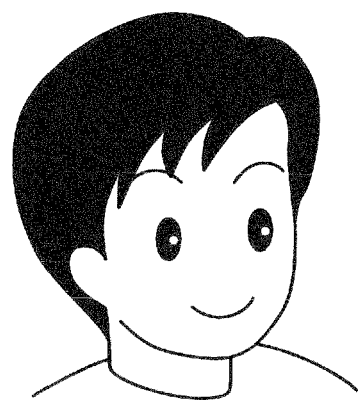
FIG. 9B is a schematic view of a subject for describing the automatic photographing condition judging processing of the image pickup apparatus of FIG. 8.
Figure 9C:
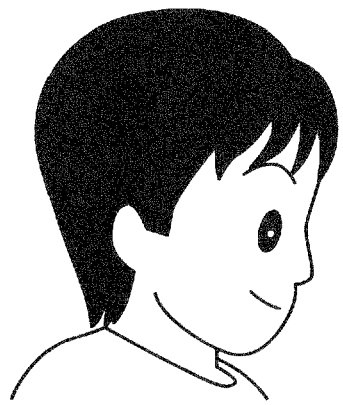
FIG. 9C is a schematic view of a subject for describing the automatic photographing condition judging processing of the image pickup apparatus of FIG. 8.

Then, when the central processing section 71 executes the automatic photographing condition judging program 72b in the program memory 72, the central processing section 71 also executes the selectable automatic photographing condition judging program together with the automatic photographing condition judging program 72b, and judges whether to satisfy the image pickup instruction standards pertaining to the plurality of kinds of selectable automatic photographing conditions set in the automatic photographing condition setting processing or not. To put it concretely, for example, in the degree of importance of the selectable automatic photographing condition "Faced Camera", the judgment standard (selectable automatic photographing condition) is judged to be satisfied only in the case where the face of a subject person is facing almost to the camera (see FIG. 9A) in the case of the highest degree of importance (the number of the dot display "black star signs" is three); the judgment standard is judged to be satisfied in the cases where the face of the subject person is facing almost to the camera and the diagonally forward (see FIGS. 9A and 9B) in the case where the degree of importance is second highest (the number of the dot display "black star signs" is two); the judgment standard is judged to be satisfied in the case where the face of the subject person is facing almost to the camera, the diagonally forward, and the transverse direction (see FIGS. 9A-9C) in the case where the degree of importance is next third highest (the number of the dot display "black star sign" is one); and the selectable automatic photographing condition is judged to be satisfied regardless of the facing direction of the subject person in the case where the degree of importance is the lowest (the number of the dot display "black star sign" is zero).

Here, the central processing section 71 functions as a judgment standard judging section to judge whether to satisfy a plurality of judgment standards set in the automatic photographing condition setting processing or not.

That is, the central processing section 71 functions to determine the automatic photographing conditions on the basis of the judgment standards of the set plurality of kinds of selectable photographing conditions, and to judge whether to satisfy the automatic photographing conditions or not.

Then, when all of the judgment standards pertaining to the plurality of kinds of selectable automatic photographing conditions are judged to be satisfied in the automatic photographing condition judging processing, the central processing section 71 executes the automatic image pickup instruction control program 72e in the program memory 72 to instruct the image pickup of the recording image for image recording to the image pickup section 1.

Incidentally, the judgment standards according to the degrees of importance of the selectable automatic photographing conditions and to the states of the level bars may be associated.

For example, as shown in FIG. 10A, when the number of the dot display "black star signs" is "0", then "exempt from photographing condition", which judges that any state satisfies the selectable automatic photographing condition, may be associated; when the number of the "black star signs" is "1", then "level bar indicating 3 or more", which judges that the state of three or more level bars satisfies the selectable automatic photographing condition, may be associated; when the number of the "black star signs" is "2", then "level bar indicating 4 or more", which judges that the state of four or more level bars satisfies the selectable automatic photographing condition, may be associated; and when the number of the "black star signs" is "3", then "level bar indicating 5", which judges that the state of five level bars satisfies the selectable automatic photographing condition, may be associated.

By the above described configuration, the settings shown in FIG. 8 may be configured as shown in FIG. 10B on the basis of the degree of importance of the selectable photographing conditions stored in the data memory 73 and of the table shown in FIG. 10A. That is, the item of "Stopped" may be associated with the condition of "level bar indicating 5"; the item of "Smiled" may be associated with the conditions of "level bar indicating 4 or more"; the item of "Sound Detected" may be associated with the condition of "exempt from photographing condition"; the item of "Faced Camera" may be associated with the condition of "level bar indicating 3 or more"; the item of "Eyes Opened" may be associated with the condition of "level bar indicating 4 or more"; and the item of "Mouth Stopped" may be associated with the condition of "exempt from photographing condition".

In FIG. 10B, it is desirable that the judgment order (N) is the same as "N" counted in the flowchart shown in FIG. 6.

Here, as for the item of "exempt from photographing condition", the flowchart shown in FIG. 6 may be configured so as to skip the processing thereof, thus the processing speed can be improved.

Incidentally, the associations of the degrees of importance of the selectable automatic photographing conditions and the judgment standards according to the states of the level bars are not limited to the ones shown in FIG. 10A, and the settings may not only be configured so as to perform the automatic photographing at a predetermined level or more (or at more than the predetermined level), but also be configured so as to perform the automatic photographing at a predetermined level or less (or less than the predetermined level).

For example, as shown in FIG. 10C, when the number of the dot display "black star signs" is "0", then the condition of "level bar indicating 2 or less", which judges that two or less level bars satisfies the selectable automatic photographing condition, may be associated; when the number of the "black star sign" is "1", then the condition of "exempt from photographing condition", which judges that any state satisfies the selectable automatic photographing condition, may be associated; when the number of the "black star signs" is "2", then the condition of "level bar indicating 3 or more", which judges that three of more level bars satisfies the selectable automatic photographing condition may be associated; and when the number of the "black star signs" is "3", then the condition of "level bar indicating 4 or more", which judges that four or more level bars satisfies the selectable automatic photographing condition may be associated.

Consequently, according to the image pickup apparatus of the first modification, the setting of the plurality of kinds of selectable automatic photographing conditions can be made to be finer, and consequently auto-shutter photographing processing can be performed in consideration of the degree of importance of each selectable automatic photographing condition. That is, by changing the largeness of the degree of importance of the selectable automatic photographing conditions, the scope of the setting of the automatic photographing conditions can be widened, and a photograph complying with user's wishes more can be obtained.

Incidentally, although the recording image for image recording is picked up when all of the judgment standards pertaining to the plurality of kinds of selectable automatic photographing conditions, which standards have been set in the automatic photographing condition judging processing, are judged to be satisfied in the first modification, the timing of the recording of the recording image is not limited to the above timing. The recording image may be picked up when at least one of the plurality of kinds of judgment standards is judged to be satisfied.

Moreover, the degree of importance may simply be used as a weight of data, and the following configuration may be adopted: 100% in the case of three "black star signs", 75% in the case of two "black star signs", 50% in the case of one "black star sign", and 25% or the turning-off of the function in the case of no "black star sign".

Moreover, the image pickup apparatus may be configured so that the shutter thereof is released when a product of each piece of data and the weight is calculated for each item and the total of the products becomes a predetermined condition or more even when not all of the items are satisfied.

Furthermore, in the first modification, an arbitrarily selectable automatic photographing condition is first selected, and then the degree of importance is set to the selected selectable automatic photographing condition, but other configurations may be adopted. The degrees of importance may be set to all of the selectable automatic photographing conditions (automatic photographing condition configuration items). In this case, the degrees of importance of the all of the selectable automatic photographing conditions are first set, and then an arbitrarily selectable automatic photographing condition may be selected to determine the automatic photographing condition and to perform photographing.

Moreover, the aforesaid embodiment and the first modification are configured to perform photographing when all of the set selectable automatic photographing conditions are satisfied, but other configurations may be adopted. The configuration of performing photographing when a predetermined number of selectable automatic photographing conditions are satisfied among the set selectable automatic photographing conditions may be adopted.

To put it more concretely, when a child moving around is photographed, it is difficult to satisfy all of the set selectable photographing conditions. Consequently, the aforesaid configuration of judging that the automatic photographing conditions are satisfied when a predetermined number of the selectable automatic photographing conditions are satisfied among the set selectable automatic photographing conditions as described above, and of performing automatic photographing is sometimes preferable.

Hereby, even in the case of a photographing situation in which it is difficult to satisfy all of the photographing conditions, the automatic photographing according to the present invention can be applied.

Moreover, a further deepened following configuration may be adopted. That is, first selectable automatic photographing conditions that are necessarily surely satisfied and second selectable automatic photographing conditions that are not necessarily satisfied are set, and it is judged that automatic photographing conditions are satisfied when all of the first selectable automatic photographing conditions and a predetermined number of selectable automatic photographing conditions among the second selectable automatic photographing conditions are satisfied to perform automatic photographing.

Hereby, it becomes possible to perform photographing nearer to a desired state.

To sum up, the aforesaid three photographing modes are:

1. When all selectable automatic photographing conditions are satisfied, automatic photographing is performed;

2. When a predetermined number of selectable automatic photographing conditions is satisfied, automatic photographing is performed; and 3. When all of the first selectable automatic photographing condition and a predetermined number of the second selectable automatic photographing conditions are satisfied, automatic photographing is performed.

The configuration of enabling an arbitrary selection of one of the three photographing modes may be adopted. Here, the selection of the photographing mode is supposed to be performed at Step S1 in the flowchart of FIG. 5.

Moreover, the three photographing modes can be realized by changing the content of the program of the automatic photographing condition judging processing at Steps S2 and S3 in the flowchart of FIG. 5.

<Second Modification>

An image pickup apparatus 200 of a second modification detects a plurality of people among subjects, and sets an automatic photographing condition to each person to perform auto-shutter photographing processing.

Incidentally, because the image pickup apparatus 200 of the second modification is almost the same as the above described embodiment except for the configuration pertaining to plural person detecting processing, the same configurations are denoted by the same reference numbers, and their descriptions are omitted.

As shown in FIG. 11, the program memory 72 stores a plural person detecting program 72f in addition to the automatic photographing condition setting program 72a, the automatic photographing condition judging program 72b, the image pickup state display control program 72c, the judgment starting time setting program 72d, and the automatic image pickup instruction control program 72e.

Further, the central processing section 71 comprises an automatic photographing condition setting program processing section 71a corresponding to the automatic photographing condition setting program 72a, an automatic photographing condition judging program processing section 71b corresponding to the automatic photographing condition judging program 72b, an image pickup state display control program processing section 71c corresponding to the image pickup state display control program 72c, a judgment starting time setting program processing section 71d corresponding to the judgment starting time setting program 72d, an automatic image pickup instruction control program processing section 71e corresponding to the automatic image pickup instruction control program 72e, a plural person detecting program processing section 71f corresponding to the plural person detecting program 72f, and the like.

The plural person detecting program 72f makes the central processing section 71 function as a plural person detecting section. That is, the plural person detecting program 72f is a program for making the central processing section 71 realize the function pertaining to the processing to detect a plurality of people from a subject image picked up by the image pickup section 1. To put it concretely, the central processing section 71 executes the plural person detecting program 72f to detect the faces of a plurality of people from a subject image by face detecting processing on the basis of the recording image data generated by the image pickup section 1.

Then, the central processing section 71 executes the automatic photographing condition setting program 72a in the program memory 72 to set automatic photographing conditions to each of the plurality of people detected by the plural person detecting processing. Here, as the setting method of automatic photographing condition, for example, the method of selecting the face of each person and an almost rectangular frame (not shown) displayed to be superimposed on the face on the basis of a predetermined operation of the operation inputting section 41, and after that, of setting automatic photographing conditions in a predetermined automatic photographing condition setting screen (not shown) can be cited.

After that, the central processing section 71 executes the automatic photographing condition judging program 72b in the program memory 72 to judge whether the automatic photographing conditions pertaining to a plurality of people which conditions have been set by the automatic photographing condition setting processing, are satisfied or not. Here, as the judging method of the automatic photographing conditions, for example, the following method can be cited: the processing of specifying a person pertaining to the judgment of the automatic photographing conditions among a plurality of people is preformed before the processing at Step S81 in FIG. 6; the succeeding processing is performed to the specified person; when all are judged to be satisfied, the next person is specified, and the same processing is performed; thereby, it is judged whether all of the automatic photographing conditions pertaining to a plurality of people are satisfied or not.

Then, when the automatic photographing conditions pertaining to the plurality of people are judged to be satisfied by the automatic photographing condition judging processing, then the central processing section 71 executes the automatic image pickup instruction control program 72e to instruct the image pickup of the recording image for image recording to the image pickup section 1.

Consequently, according to the image pickup apparatus 200 of the second modification, even when a plurality of people are included in a subject, automatic photographing conditions can be arbitrarily set to the plurality of people by the auto-shutter photographing processing, and a user-desired photograph can be easily obtained.

For example, when a family photograph is taken by the automatic photographing, the automatic photographing conditions can be individually set to adults, such as a father and a mother, and a baby. Consequently, even when the movement of the baby is unrestful or the baby is sleeping, a user-desired photograph can be obtained by not setting predetermined automatic photographing conditions, such as "Stopped", "Faced Camera", "Eyes Opened", and the like, to the baby, or by making the judgment standards of the automatic photographing condition looser even when the conditions are set.

Incidentally, the order of judging the selectable automatic photographing conditions to a plurality of people may be set, for example, to give the priority to a person near to the center or an adult (an elderly person), or to conform to the degree of importance, such as the order of registered faces (for example, father→mother→child) or the like.

To put it concretely, the order may be set as follows: the higher the degree of importance is, the larger the person number associated with each person is set to be; and the larger the person number is, the latter the judgment order of the selectable automatic photographing conditions is.

For example, when the judging of the selectable automatic photographing conditions is set to be performed in the order of the persons having lower degrees of importance, as shown in FIG. 12A, the judgment orders set as follows are stored in the data memory 73: the judging of the item of "Stopped" and the condition of "level bar indicating 4 or more" that are associated to a person (person number "1") having the lowest degree of importance is set as a judgment order "1"; the judging of the item of "Smiled" and the condition of "level bar indicating 5" that are associated to the same person is set as a judgment order "2"; the judging of the item of "Faced Camera" and the condition of "level bar indicating 4 or more" that are associated with the same person is set as the judgment order "3"; the judging of the item of "Stopped" and the condition of "level bar indicating 4 or more" that are associated with a person (person number "2") having the second lowest degree of importance is set as a judgment order "4"; the judging of the item of "Smiled" and the condition of "level bar indicating 5" that are associated with same person is set as a judgment order "5"; the judging of the item of "Faced Camera" and the condition of "level bar indicating 4 or more" that are associated with the same person is set as a judgment order "6"; the judging of the item of "Stopped" and the condition of "level bar indicating 4 or more" that are associated with a person (person number "3") having the highest degree of importance is set as a judgment order "7"; the judging of the item of "Smiled" and the condition of "level bar indicating 5" that are associated with the same person is set as a judgment order "8"; and the judging of the item of "Faced Camera" and the condition of "level bar indicating 4 or more" that are associated with the same person is set as a judgment order "9".

At this time, for example, the automatic photographing condition orders having the lower degrees of importance may be preferentially considered, that is, the selectable automatic photographing conditions may be judged in the order of the automatic photographing conditions having the lower degrees of importance and the people having lower degrees of importance.

To put it concretely, as shown in FIG. 12B, the judgment orders set as follows are stored in the data memory 73: the judging of the item of "Stopped" associated with the condition of "level bar indicating 4 or more" and associated with a person (person number "1") having the lowest degree of importance is set as a judgment order "1"; the judging of the item of "Stopped" associated with the condition of "level bar indicating 4 or more" and associated with a person having the second lowest degree of importance (person number "2") is set as a judgment order "2"; the judging of the item of "Stopped" associated with the condition of "level bar indicating 4 or more" and associated with a person (person number "3") having the highest degree of importance is set as the judgment order "3"; the judging of the item of "Faced Camera" associated with the condition of "level bar indicating 4 or more" and associated with the person (person number "1") having the lowest degree of importance is set as a judgment order "4"; the judging of the item of "Faced Camera" associated with the condition of "level bar indicating 4 or more" and associated with the person (person number "2") having the second lowest degree of importance is set as a judgment order "5"; the judging of the item of "Faced Camera" associated with the condition of "level bar indicating 4 or more" and associated with a person (person member "3") having the highest degree of importance is set as a judgment order "6"; the judging of the item of "Smiled" associated with the condition of "level bar indicating 5" and associated with the person (person number "1") having the lowest degree of importance is set as a judgment order "7"; the judging of the item of "Smiled" associated with the condition of "level bar indicating 5" and associated with the person (person number "2") having the second lowest degree of importance is set as a judgment order "8"; and the judging of the item of "Smiled" associated with the condition of "level bar indicating 5" and associated with the person (person number "3") having the highest order of importance is set as a judgment order "9".

Incidentally, although the judging of the items of "Stopped" of a plurality of people is preferentially performed to the judging of the items of "Faced Camera", both the items "Stopped" and "Faced Camera" are associated with the condition of "level bar indicating 4 or more", and consequently their judgment orders are not limited to the ones described above, and the judgment orders of the items of "Faced Camera" may be set as the prior ones.

Incidentally, although the central processing section 71 instructs the image pickup of the recording image when all of the automatic photographing conditions pertaining to a plurality of people are judged to be satisfied in the second modification described above, the timing of the instruction is not limited to that. For example, it may be possible to adopt the configuration of starting the judgment of the automatic photographing conditions from a person situated in almost the center in the angle of view to instruct the image pickup of the recording image when at least the automatic photographing conditions pertaining to the person are satisfied.

Furthermore, when the image pickup time state screen C pertaining to the image pickup state of a subject is displayed in the image displaying section 32 in real time by the image pickup apparatus 200 of the second modification, only the image pickup time state screen C pertaining to the person who does not satisfy the automatic photographing conditions may be displayed, or may be displayed to be switched to a plurality of people.

Moreover, although the second modification enables the setting of a plurality of automatic photographing conditions corresponding to each person, the method of the setting is not limited to this one. For example, the method of setting any one of the automatic photographing conditions and performing photographing when the set automatic photographing condition is satisfied by all the people may be adopted. Alternatively, the method of performing the photographing when only a predetermined person (for example, a person situated at the center) satisfies the set automatic photographing condition may be adopted.

Moreover, although the embodiment is set to perform the self-timer photographing processing, the aspect is not limited to this one. The method of performing automatic photographing condition judging processing immediately after a user's predetermined operation of the shutter button 41a may be adopted.

Moreover, the embodiment is adapted to display the image pickup state of a subject in the image displaying section 32 in real time, but the display of the image pickup state is not limited to this manner. The image pickup state of the subject may be informed by another informing section. For example, an LED capable of displaying the changes of image pickup state may be provided on the front sides of the image pickup apparatus 100 or 200, or a speaker sounding different sounds according to image pickup states may be installed.

Furthermore, although the embodiment is adapted to pick up the recording image for image recording when all of the set plurality of kinds of selectable automatic photographing conditions is judged to be satisfied in the automatic photographing condition judging processing, the time of the recording image pickup is not limited to this one. The recording image may be set to be picked up when at least one of the plurality of kinds of selectable automatic photographing conditions is judged to be satisfied.

Furthermore, although the embodiment is configured to perform the judgment of acceptability to each item of each selectable automatic photographing condition, and to perform photographing when all of the items are accepted, the manner is not limited to this one. Each item of each selectable automatic photographing condition may be given a score, and photographing may be performed when the total score becomes a predetermined one ore more. That is, in place of setting a predetermined number of automatic photographing conditions among a plurality of kinds of selectable automatic photographing conditions defined as the candidates of the selectable and settable automatic photographing conditions, one automatic photographing condition may be set by combining the items of the plurality of kinds of selectable automatic photographing conditions.

Hereby, the degree of freedom of the setting of an auto-shutter can be improved.

Moreover, although the embodiment and the first and second modifications are configured to photograph one still image by performing automatic photographing when the automatic photographing conditions are satisfied, the present invention is not limited to such a configuration. For example, the configuration of recording a still image at the timing when the automatic photographing conditions are satisfied among the images that are being photographed as a moving image, continuously shot images, or through-the-lens images may be adopted. That is, the configuration of performing only the recording of photographed image when the automatic photographing conditions are satisfied while performing photographing continuously may be adopted.

Moreover, the configurations exemplified in the embodiments of the image pickup apparatus 100 and 200 are only examples, and are not limited to those.

Furthermore, although, as the selectable automatic photographing conditions, "Stopped", "Smiled", "Sound Detected", "Faced Camera", "Eyes Opened", and "Mouth Stopped" are exemplified, the selectable automatic photographing conditions are not limited to those ones. Anything may be used as long as they can be applied as the judgment standards of whether to instruct the image pickup or not at the time of selectable automatic photographing processing.

In addition, the embodiment adopts the configuration of realizing the functions as the condition setting section, the condition judging section, the instruction control section, the individual judgment section, the standard setting section, the judgment starting time setting section, the plural person detecting section, the image pickup state sequential display control section, and the after-image pickup state displaying control section by the execution of the predetermined programs and the like by the central processing section 71, but the present invention is not limited to the configuration. For example, the functions may be realized by the configuration of logic circuits and the like for realizing the various functions.

Further, the embodiment above adopts the configuration performing each judgment according to the predetermined judgment order, but each processing is actually performed with a considerable amount of processing speed. Thus, although each processing is individually performed in the embodiment, all of the judgments may be regarded as being performed at almost the same time.

Moreover, although the embodiment above adopts the configuration performing each judgment according to the predetermined judgment order, the present invention is not limited to the configuration.

To put it concretely, a configuration in which a plurality of judgments may be performed at the same time, or a configuration in which all of the judgments may be performed at the same time, may be adopted.

Thereby, there is an advantage in which a photographed image which further satisfies all the conditions at the same time can be obtained.

Moreover, the embodiment above mainly describes regarding the detection of people's faces and the specification of a person, but the present invention is of course not limited to this, and may perform the detection and the specification of a notable subject such as a car, an animal and the like, instead of those of people.

The entire disclosure of Japanese Patent Application No. 2007-234102 filed on Sep. 10, 2007 including description, claims, drawings, and abstract are incorporated herein by reference in its entirety.

What is claimed is:

1. An image pickup apparatus comprising:
an image pickup section to pick up a subject;
a plurality of persons detecting section to detect a plurality of persons in the subject to be picked up by the image pickup section;
an automatic photographing condition setting section to arbitrarily set, person by person, respective different conditions individually for each of the plurality of persons detected by the plurality of persons detecting section, among a plurality of kinds of selectable automatic photographing conditions which are settable by being selected, so as to set an automatic photographing condition;
an automatic photographing condition judging section to judge whether the automatic photographing condition set by the automatic photographing condition setting section is satisfied or not; and
an automatic image pickup instruction control section to instruct the image pickup section to pick up the subject or to instruct that a subject image be recorded, when the automatic photographing condition is judged to be satisfied by the automatic photographing condition judging section.

2. The image pickup apparatus according to claim 1, further comprising a selectable automatic photographing condition judging section to judge whether the selectable automatic photographing conditions set by the automatic photographing condition setting section are individually satisfied or not.

3. The image pickup apparatus according to claim 2, wherein the automatic photographing condition judging section judges that the automatic photographing condition is satisfied, when all of the selectable automatic photographing conditions are judged to be satisfied by the selectable automatic photographing condition judging section.

4. The image pickup apparatus according to claim 2, wherein the automatic photographing condition judging section judges that the automatic photographing condition is satisfied, when a predetermined number of the selectable automatic photographing conditions are judged to be satisfied by the selectable automatic photographing condition judging section.

5. The image pickup apparatus according to claim 2, further comprising a standard setting section to set judgment standards pertaining to a judgment of the selectable automatic photographing conditions for each of the plurality of kinds of selectable automatic photographing conditions,
wherein the selectable automatic photographing condition judging section judges whether the judgment standards set by the standard setting section are satisfied or not, to judge whether the selectable automatic photographing conditions are satisfied or not according to a result of the judgment.

6. The image pickup apparatus according to claim 1, further comprising a photographing condition recording section to record, after the subject is picked up by the image pickup section, the automatic photographing condition set by the automatic photographing condition setting section, and image information picked up and generated by the image pickup section, so that the automatic photographing condition and the image information are associated with each other.

7. The image pickup apparatus according to claim 1, further comprising an image pickup state recording section to record, after the subject is picked up by the image pickup section, image information picked up and generated by the image pick up section, and an image pickup state of the subject related to the automatic photographing condition, so that the image information and the image pickup state are associated with each other.

8. The image pickup apparatus according to claim 1, further comprising a judgment starting time setting section to set a judgment starting time of judging whether the automatic photographing condition is satisfied or not by the automatic photographing condition judging section, to be started when a predetermined amount of time passes after a predetermined operation.

9. The image pickup apparatus according to claim 1, further comprising an image pickup state sequence display control section to make an image pickup state which is associated with the automatic photographing condition of the subject image picked up by the image pickup section be sequentially displayed, based on a judgment result of whether the automatic photographing condition is satisfied or not by the automatic photographing condition judgment section.

10. The image pickup apparatus according to claim 1, further comprising an after-image pickup state display control section to make the subject image at the time of the subject being picked up by the image pickup section, and an image pickup state which is associated with the automatic photographing condition of the subject image be displayed, after the subject is picked up by the image pickup section.

11. A non-transitory computer-readable recording medium storing a computer-executable program for controlling an image pickup apparatus comprising an image pickup section to pick up a subject to perform functions comprising:
- detecting a plurality of persons in the subject to be picked up by the image pickup section;
- arbitrarily setting, person by person, respective different conditions individually for each of the plurality of persons, among a plurality of kinds of selectable automatic photographing conditions which are settable by being selected, so as to set an automatic photographing condition;
- judging whether the set automatic photographing condition is satisfied or not; and
- instructing the image pickup section to pick up the subject or instructing that a subject image be recorded, when the automatic photographing condition is judged to be satisfied.

* * * * *